(12) United States Patent
Lin et al.

(10) Patent No.: US 7,580,590 B2
(45) Date of Patent: Aug. 25, 2009

(54) OPTICAL IMAGE SYSTEM SURFACE RESOLUTION CALIBRATION METHOD

(75) Inventors: Yao-Min Lin, Taoyuan Hsien (TW); Wei-Che Chang, Taoyuan Hsien (TW); Huang-Chang Chang, Taoyuan Hsien (TW)

(73) Assignee: Chroma Ate Inc., Taoyuan Hsien (TW)

( * ) Notice: Subject to any disclaimer, the term of this patent is extended or adjusted under 35 U.S.C. 154(b) by 722 days.

(21) Appl. No.: 11/369,850

(22) Filed: Mar. 8, 2006

(65) Prior Publication Data

US 2007/0076170 A1 Apr. 5, 2007

(30) Foreign Application Priority Data

Oct. 3, 2005 (TW) .............................. 94134499 A

(51) Int. Cl.
*G06K 9/36* (2006.01)
*G06K 9/32* (2006.01)
*G02B 21/00* (2006.01)
*A61B 3/00* (2006.01)

(52) U.S. Cl. ...................... 382/286; 382/287; 382/299; 351/246; 359/380

(58) Field of Classification Search ................. 382/286; 351/246
See application file for complete search history.

(56) References Cited

U.S. PATENT DOCUMENTS 4,736,739 A * 4/1988 Flaton ........................ 128/853
5,967,979 A * 10/1999 Taylor et al. ................. 600/407
6,320,641 B1 * 11/2001 Bauer et al. .................... 355/18

OTHER PUBLICATIONS van der Laak et al., "Automated magnification calibration in transmission electron microscopy using Fourier analysis of replica images", Ultramicroscopy, vol. 106, Issues 4-5, Mar. 2006, pp. 255-260.*
McCaffrey et al., "A transmission electron microscope (TEM) calibration standard sample for all magnification, camera constant, and image/diffraction pattern rotation calibrations", Microscopy Research and Technique 32, 1995, pp. 449-454.*

* cited by examiner

*Primary Examiner*—Brian P Werner
*Assistant Examiner*—Jose M Torres
(74) *Attorney, Agent, or Firm*—Birch, Stewart, Kolasch & Birch, LLP

(57) ABSTRACT

An optical image system surface resolution calibration method is provided herein, which utilizes a calibration standard and an image sensor device. The surface of the calibration standard is provided with a plurality of interleaving bright lines and dark lines, the calibration standard is disposed in a plane to be measured, and the image sensor device is provided with an imaging means, a memory means, and a logic-arithmetic means, that is used to fetch the image information of the calibration standard and store the image information thus obtained. Meanwhile, the image sensor device is used to select and calculate the linear equations of the bright lines, and finally calculate the magnification factor of the image fetched by the image sensor device through the geometric mathematical means by making use of the slope and intersection distance of the linear equation and the average distance between the adjacent bright lines calculated from the intersection distance.

6 Claims, 7 Drawing Sheets

OPTICAL IMAGE SYSTEM SURFACE RESOLUTION CALIBRATION METHOD

BACKGROUND OF THE INVENTION

1. Field of the Invention

The present invention relates to a surface resolution calibration method utilized in an optical image system, and in particular to a calibration method that can be used to correct the image magnification factor of the corresponding pixel.

2. The Prior Arts

In the prior art, the optical image system surface resolution calibration method is used by the imaging device for calibration, thus the magnification factor of images produced by the pixel of CCD sensor or CMOS sensor is determined. Usually, this kind of technology is realized through a scaled image having size indication produced by an imaging device. Referring to FIG. 7 for a schematic diagram for the implementation of surface resolution calibration method used in the optical image system of the prior art. As shown in FIG. 7, the positions P1 and P2 on the scale are determined manually or by an image processing method, and these positions are used to calculate the distance between the two pixels corresponding to the two positions P1 and P2 on the scale. Since the actual distance between the positions P1 and P2 on the scale 6 is determined by design, thus the actual size of the object to be measured that corresponds to the positions of the pixels of the optical image system can be obtained by comparing the size of the actual distance and the distance between the two pixels. However, in the implementation of this technology, the disposition of the scale must reach the horizontal axis paralleling to the horizontal axis as determined by the pixels of the imaging device, and if there exists an inclination angle between the scale and the horizontal axis, then the measured result will be shorter than the actual size of the object to be measured, as such producing linear deviation. Therefore, the scale used in the optical image system surface resolution calibration method of the prior art must be utilized in cooperation with a revolving table to adjust the parallelism of the scale, hereby increasing the complexity of the mechanism of the optical image system, and adversely affecting the accuracy and speed of the calibration.

Therefore, the research and development of an optical image system surface resolution calibration method and device that can be used to raise the accuracy and speed of the calibration and simplify its complexity, is the most important task in this field.

SUMMARY OF THE INVENTION

The objective of the present invention is to provide an optical image system surface resolution calibration method that can be utilized to achieve the calibration of the image sensor device through the image information of the calibration standard fetched by the image sensor device, by making use of a standard sheet having parallel interleaving bright/dark line pairs as the calibration standard.

The another objective of the present invention is to provide an optical image system surface resolution calibration method that can be used to simplify the calibration procedure, raise the calibration speed, accuracy and convenience.

To achieve the above-mentioned objective, the present invention provides an optical image system surface resolution calibration method that includes a calibration standard and an image sensor device. The surface of the calibration standard is provided with a plurality of interleaving dark/bright straight lines, and the calibration standard is disposed on a plane to be measured; the image sensor device is provided with an imaging means, a memory means, and a logic-arithmetic means. The surface resolution calibration method is realized through the following steps: selecting a plurality of sequentially arranged dark lines and bright lines in the effective sensing range of the image sensor device; fetching the image information of the calibration standard through the image sensor device and storing the image information thus obtained; utilizing an image processing method to determine the image boundary by the logic-arithmetic means, defining the orthogonal first axis and second axis by utilizing the pixel of the image sensor device as the reference coordinate, and calculating to obtain the number of the selected bright lines and their linear equations. Wherein, the parameters related to the linear equation include the slope (a) and the intersection distance (b), thus the slope (a) represents the distance increased along the second axis vs the distance increased along the first axis, while the intersection distance (b) represents the distance from the point of the straight line crossing the first axis to the origin of the coordinate; utilizing the logic-arithmetic means to calculate the average distance $\Delta b$ between the adjacent bright lines in the direction of the second axis by making use of the intersection distances (b) of the respective bright line linear equations; and utilizing the logic-arithmetic means to calculate and obtain the magnification factor $\Delta b/\sqrt{1+a^2}$ of the image fetched by the image sensor device.

In addition, the method mentioned above may further comprise the following steps: calculating and obtaining the second linear equation of the selected bright line. Wherein, the parameters related to the second linear equation include the slope $a_2$ and the intersection distance $b_2$, thus the slope $a_2$ represents the distance increased along the first axis vs the distance increased in the second axis, while the intersection distance $b_2$ represents the distance from the point of the straight line crossing the first axis to the origin of the coordinate; utilizing the logic-arithmetic means to calculate the average distance $\Delta b_2$ between the adjacent bright lines in the direction of the first axis by making use of the intersection distances $b_2$ of the respective bright line linear equations; and utilizing the logic-arithmetic means to calculate and obtain the magnification factor $\Delta b_2/\sqrt{1+a_2^2}$ of the image fetched by the image sensor device.

Furthermore, if it is determined by the arithmetic-logic means that the average variation along the first axis is greater than the average variation along the second axis, then select to execute the step of calculating the slope (a), the intersection distance (b), the average distance $\Delta b$, and the image magnification factor $\Delta b/\sqrt{1+a^2}$ of the bright line linear equation; and if it is determined by the arithmetic-logic means that the average variation along the first axis is less than the average variation along the second axis, then select to execute the step of calculating the slope $a_2$, the intersection distance $b_2$, the average distance $\Delta b_2$, and the image magnification factor $\Delta b_2/\sqrt{1+a_2^2}$ of the bright line linear equation.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, and functions of the present invention can be appreciated and understood more thoroughly through the following detailed description with reference to the attached drawings.

Figure 1:
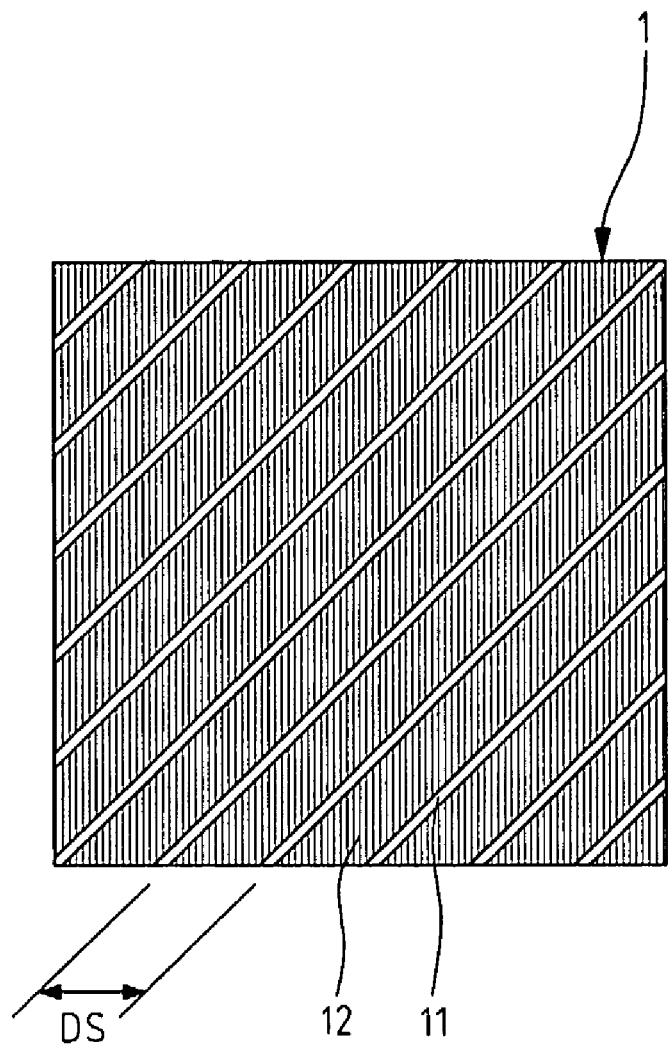
FIG. 1 is a schematic diagram of a calibration standard used in the surface resolution calibration method of the optical image system according to an embodiment of the present invention.
Figure 2:
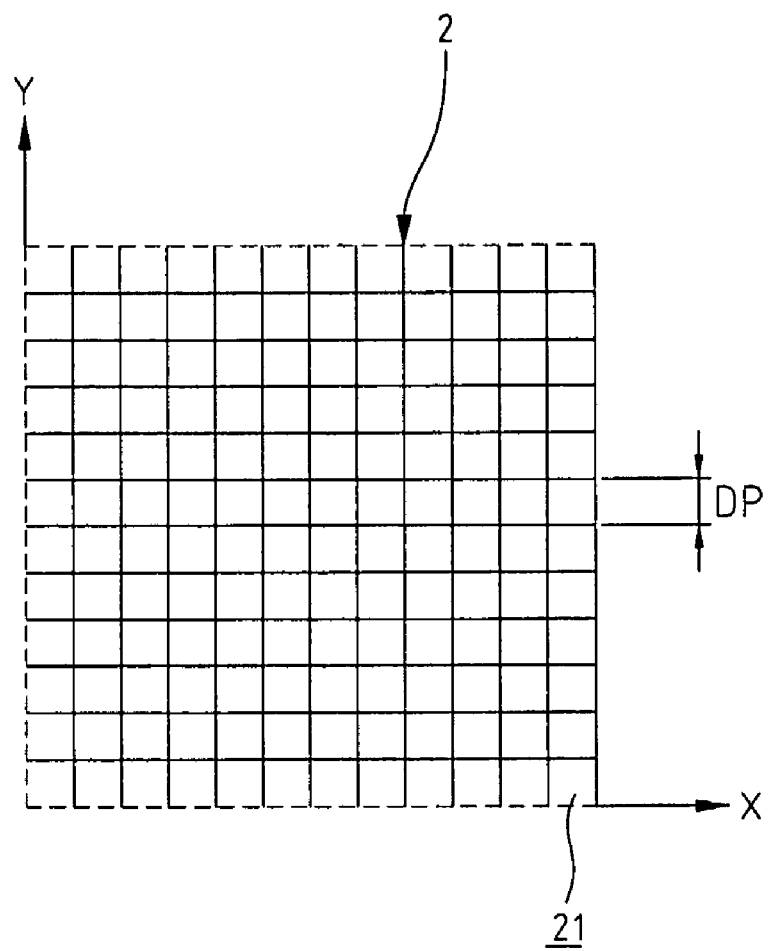
FIG. 2 is a schematic diagram of a coordinate of a sensor element used in the surface resolution calibration method of the optical image system according to an embodiment of the present invention.

Firstly, referring to FIGS. 1 & 2. FIG. 1 is a schematic diagram of a calibration standard used in the surface resolution calibration method of the optical image system according to an embodiment of the present invention. FIG. 2 is a schematic diagram of a coordinate of a sensor element used in the surface resolution calibration method of the optical image system according to an embodiment of the present invention. As shown in FIG. 1, the calibration standard 1 used in the present invention is provided with a plurality of interleaving bright lines 11 and dark lines 12, the bright lines 11 are parallel to each other and having the same width, likewise, the dark lines 12 are also parallel to each other and having the same width, wherein the actual distance between the bright lines 11 is DS. Moreover, as shown in FIG. 2, which shows a schematic diagram of a measurement coordinate 2 of an image sensor device (not shown), wherein, each of the unit grids 21 corresponds to a pixel area of the image sensor device. For example, the image sensor device is a CCD sensor, and each of the unit grids 21 corresponds to a single pixel area of a CCD sensor. The length of a side of a unit grid 21 is the unit length DP, that is the width of a pixel of the CCD sensor, namely, the minimum resolution length that CCD sensor is capable of measuring directly.

In the above description, in addition to the CCD sensor, the CMOS sensor may also be utilized as the image sensor device.

Figure 3:
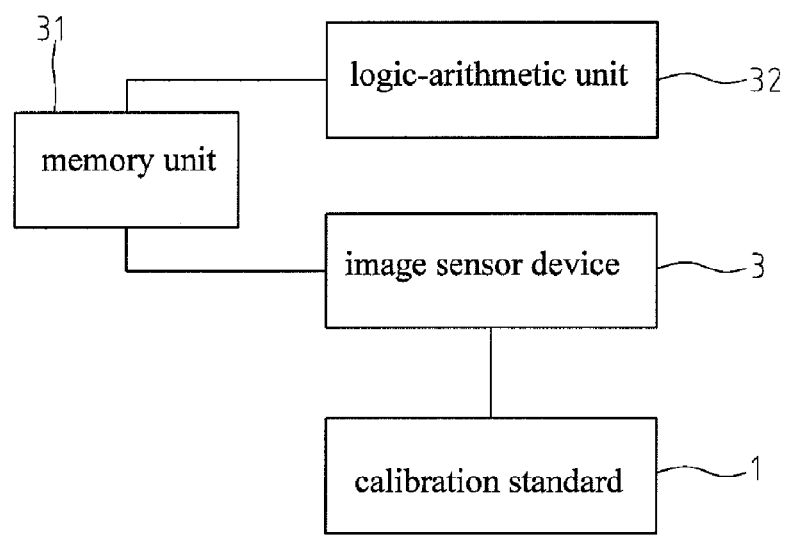
FIG. 3 is a structure block diagram of the imaging device used in the surface resolution calibration method of the optical image system according to an embodiment of the present invention.
Figure 4:
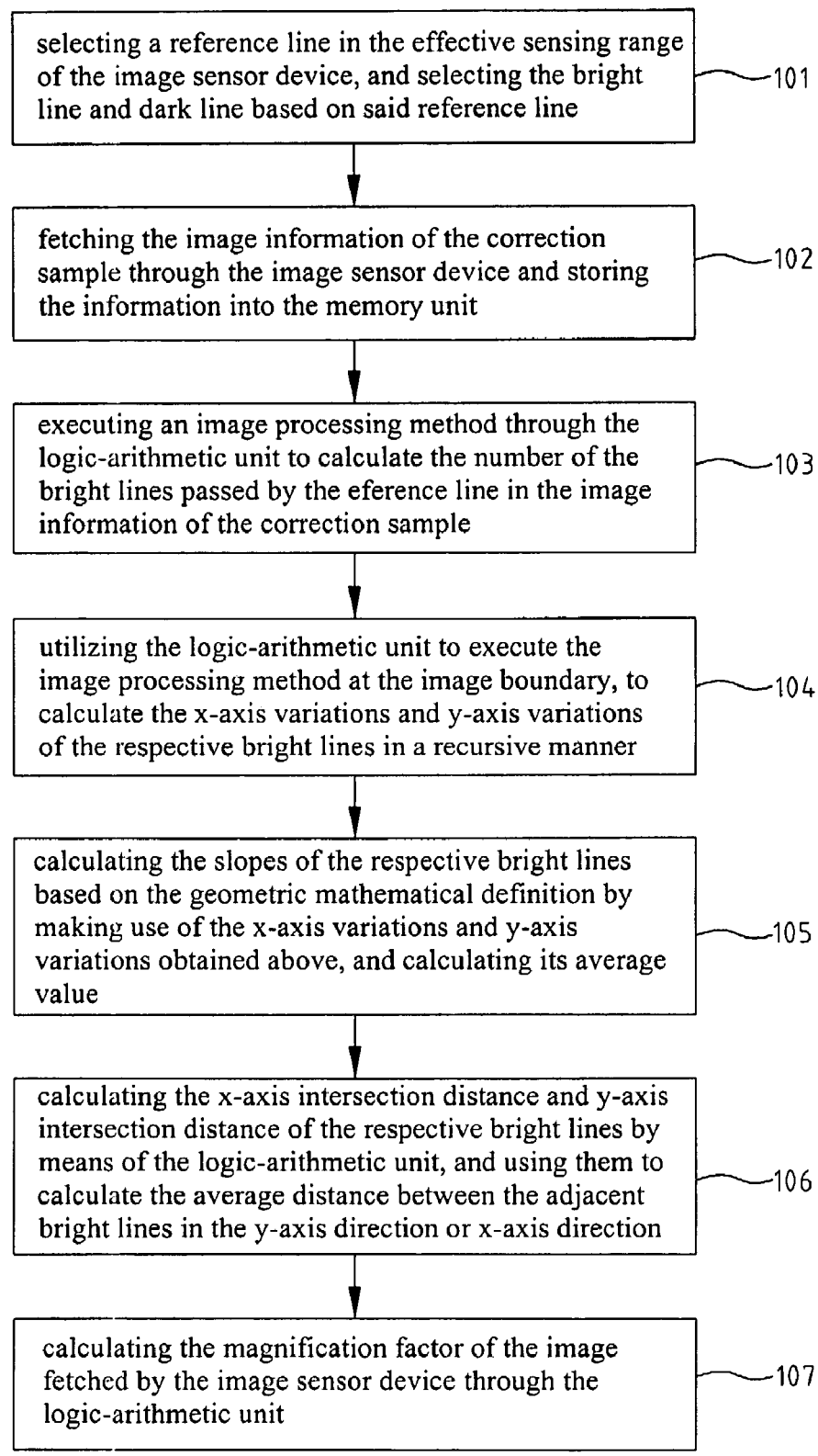
FIG. 4 is a flowchart of the steps of surface resolution calibration method utilizing the optical image system as shown in FIG. 3 according to an embodiment of the present invention.
Figure 5:
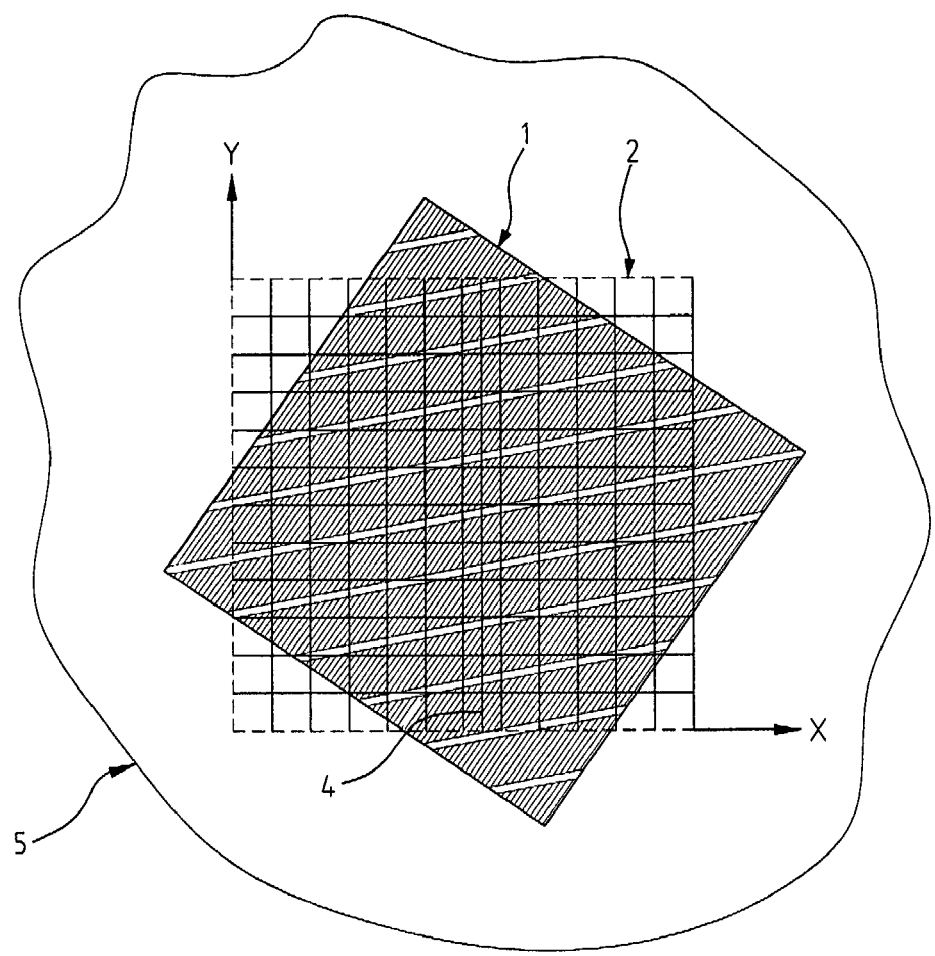
FIG. 5 is a schematic diagram indicating the operation of a calibration standard in a sensor element coordinate according to the surface resolution calibration method of the present invention as shown in FIG. 4.
Figure 6:
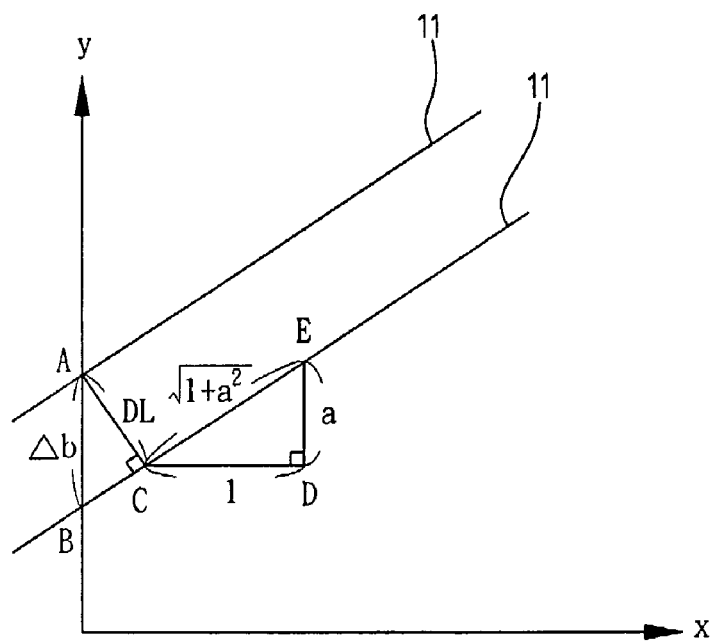
FIG. 6 is a schematic diagram indicating the geometric relations of the parameters utilized in the linear equation of a bright line according to an embodiment of the present invention.
Figure 7:
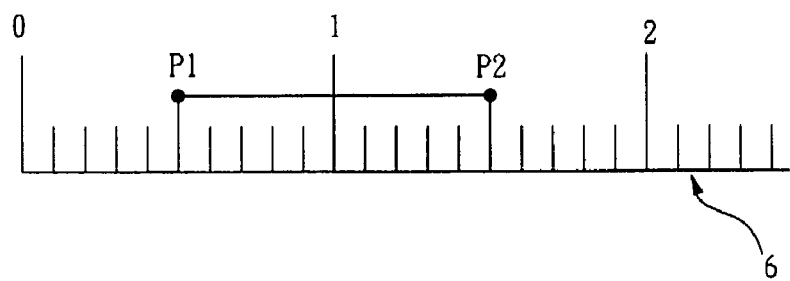
FIG. 7 is a schematic diagram of a calibration scale used in measuring the size of an object, that is utilized in the surface resolution calibration method of the optical image system according to prior art.

Then, referring to FIGS. 3 to 6. FIG. 3 is a structure block diagram of the imaging device used in the surface resolution calibration method of the optical image system according to an embodiment of the present invention. FIG. 4 is a flowchart of the steps of surface resolution calibration method utilizing the optical image system as shown in FIG. 3 according to an embodiment of the present invention. FIG. 5 is a schematic diagram indicating the operation of a calibration standard in a sensor element coordinate according to the surface resolution calibration method of the present invention as shown in FIG. 4. FIG. 6 is a schematic diagram indicating the geometric relations of the parameters utilized in the linear equation of a bright line according to an embodiment of the present invention. As shown in FIG. 5, in the implementation of the surface resolution calibration method utilizing the optical image system, the calibration standard 1 may be placed arbitrarily in a plane 5 to be measured without regard to the inclination angle of the calibration standard 1 to the x-axis in the coordinate of the sensor element. Thus, an image sensor device 3 may be utilized to fetch the image information of the calibration standard 1, store the image obtained in a memory unit 31, and execute an image processing method through a logic-arithmetic unit 32. In the following, the various steps of the surface resolution calibration method utilizing the optical image system will be described in detail. As shown in FIGS. 4 & 5, firstly, selecting a reference line 4, that is an imaginary line located in the effective sensing range of an image sensor device 3, and then selecting a bright line 11 and a dark line 12 based on the position and orientation of the reference line 4 (step 101); fetching the image information of the calibration standard 1 by the image sensor device 3, and storing the image information into the memory unit 31 (step 102); executing the image processing method by the logic-arithmetic unit 32, and calculating and obtaining the number of the bright lines 11 passed by the reference line 4 in the image information of the calibration standard 1 through the determination of image boundary (step 103); calculating the average variations of the respective bright lines 11 in the x-axis and y-axis recursively by making use of the image information of the calibration standard 1 fetched in the previous step and the image processing method at image boundary as executed by the logic-arithmetic unit 32 (step 104); calculating the slopes of the respective bright lines 11 based on the geometric mathematical definition by making use of the x-axis average variations and y-axis average variations obtained above, and calculating the average value of slope (a) for the respective bright lines 11 through the logic-arithmetic unit 32 (step 105); calculating the x-axis intersection distance or y-axis intersection distance of the respective bright lines 11 by the logic-arithmetic unit 32, and using them to calculate the average distance Δb between the adjacent bright lines 11 in the y-axis direction or x-axis direction (step 106); calculating the magnification or the reduction factor of the image fetched by the image sensor device 3 through the logic-arithmetic unit 32 (step 107). For the above-mentioned method, the calculation of the average distance Δb between the bright lines 11 in y-axis is taken as an example, as shown in FIG. 6, and that is realized by making use of the fact that: triangle ABC and triangle CDE are similar, wherein, one leg of triangle CDE has the length of a unit pixel (equivalent to the width of a pixel, and is set to 1), and the length of another leg is (a), as such, according to the hypotenuse-leg theorem, the hypotenuse length of triangle CDE is $\sqrt{1+a^2}$. Since the vertical distance between the adjacent bright lines 11 is DL (namely, the length of one leg of triangle ABC), wherein the vertical distance DL is the inherent value of calibration standard 1, so that DL/1=$\Delta b/\sqrt{1+a^2}$, namely the ratio of unit pixel width to the actual length of calibration standard 1 is $\Delta b/\sqrt{1+a^2}$, thus obtaining the image magnification factor or reduction factor of the actual size calibration standard 1. Similarly, the image magnification or reduction factor can be obtained through the calculations conducted along the x-axis.

In the above descriptions, the calibration standard 1 utilized may be the standard sheet produced by Edmund Industrial Optics Co.

Moreover, in the above steps 101 to 106, the position of a pixel in image sensor device 3 is utilized as a reference coordinate to calculate the linear equations of the respective bright lines 11. According to the example mentioned earlier, the linear equation of the respective bright line 11 can be represented by the expression that its value on y-axis is obtained by multiplying the slope of this particular bright line by its value on x-axis, and then adding to the result thus obtained with its intersection distance on y-axis. Since the slopes of the respective bright lines 11 are known and are the same, the only difference is their intersection positions on y-axis, however, the differences of intersection distances between the adjacent bright lines are the same.

Furthermore, in the above-mentioned steps, in case that the pixel of the image sensor device utilized is of square shape, then the above calculation process has only to be executed for either the x-axis or the y-axis, hereby obtaining the image magnification or reduction factor corresponding to the minimum resolution length of the pixel of the image sensor device. However, in case that the pixel of the image sensor device utilized is of rectangular shape, then the above calculation process has to be executed for both the x-axis and the y-axis, so as to obtain the image magnification or reduction factor corresponding to the minimum resolution length of the pixel of the image sensor device along the x-axis and y-axis respectively. Moreover, in case that the lines of the calibration standards are close to parallel to x-axis or y-axis, then the above calculation process has to be executed for both the x-axis and the y-axis, so as to obtain the image magnification or reduction factor corresponding to the minimum resolution length of the pixel of the image sensor device along the x-axis and y-axis respectively. In this case, if the average variations of the bright line along the x-axis is greater than the average variations of the bright line along the y-axis, then the above calculation process is executed for the y-axis, hereby obtaining the image magnification or reduction factor corresponding to the minimum resolution length of the pixel of the image sensor device, however, if the average variations of the bright line along the x-axis is less than the average variations of the bright line along the y-axis, then the above calculation process is executed for the x-axis, thus obtaining the image magnification or reduction factor corresponding to the minimum resolution length of the pixel of the image sensor device.

The above detailed description of the preferred embodiment is intended to describe more clearly the characteristics and spirit of the present invention. However, the preferred embodiments disclosed above is not intended to be any restrictions to the scope of the present invention. Conversely, its purpose is to include the various changes and equivalent arrangements which are within the scope of the appended claims.

What is claimed is:

1. An optical image system surface resolution calibration method, comprising the following steps:

providing a calibration standard and an image sensor device, the surface of said calibration standard being provided with a plurality of interleaving bright lines and dark lines, said calibration standard being disposed in a plane to be measured, said image sensor device being provided with an imaging means, a memory means, and a logic-arithmetic means;

selecting a plurality of sequentially arranged bright lines and dark lines within the effective sensing range of said image sensor device;

fetching the image information of the calibration standard and storing the image information by the memory means of said image sensor device;

determine the image boundary by the logic-arithmetic means, defining the orthogonal first axis and second axis by utilizing the pixel of the image sensor device as the reference coordinate, and calculating to obtain the number of the selected bright lines and their linear equations, wherein, the parameters related to the linear equation include the slope (a) and the intersection distance (b), thus the slope (a) represents the distance increased along the second axis vs the distance increased along the first axis, while the intersection distance (b) represents the distance from the point the straight line crossing the first axis to the origin of the coordinate;

calculating the average distance $\Delta b$ between adjacent bright lines along the direction of the second axis through said logic-arithmetic means by making use of the intersection distances (b) of the respective bright line linear equations; and calculating and obtaining through said logic-arithmetic means the magnification factor $\Delta b/\sqrt{1+a^2}$ for the image fetched by said image sensor device.

2. The optical image system surface resolution calibration method as claimed in claim 1, comprising further the following steps:

selecting a reference line, said reference line being an imaginary line located in the effective sensing range of the image sensor device, which is used to select the bright lines and dark lines.

3. The optical image system surface resolution calibration method as claimed in claim 1, comprising further the following steps:

calculating the first axis average variations and the second axis average variations for the respective bright lines through the logic-arithmetic means in a recursive manner; and calculating the slope (a) through the geometric mathematical definition by making use of the logic-arithmetic means, which is the average of the slopes of the respective bright lines calculated and obtained based on the first axis average variation and the second axis average variation.

4. The optical image system surface resolution calibration method as claimed in claim 1, comprising further the following steps:

calculating the second linear equations of the selected bright lines, that includes the information of the slope $a_2$ and intersection distance $b_2$, said slope $a_2$ is the first axis distance increased when the straight line on the second axis is increased a unit distance, and the intersection distance $b_2$ is the distance from the position the straight line crossing the first axis to the origin of the coordinate;

calculating the average distance $\Delta b_2$ between adjacent bright lines along the direction of the first axis through said logic-arithmetic means by making use of the intersection distances b of the respective bright line linear equations; and calculating and obtaining through said logic-arithmetic means the magnification factor $\Delta b_2/\sqrt{1+a_2^2}$ for the image fetched by said image sensor device.

5. The optical image system surface resolution calibration method as claimed in claim 1, comprising further the following steps:

if it is determined through the logic-arithmetic means that the average variation of the straight line on the first axis is greater than that on the second axis, then execute the step of calculating the slope (a), intersection distance (b), average distance $\Delta b$, and image magnification factor $\Delta b/\sqrt{1+a^2}$ of the bright line linear equation; and if it is determined through the logic-arithmetic means that the average variation of the straight line on the first axis is less than that on the second axis, then execute the step of calculating the slope $a_2$, intersection distance $b_2$, average distance $\Delta b_2$, and image magnification factor $\Delta b_2/\sqrt{1+a_2^2}$ of the bright line linear equation.

6. The optical image system surface resolution calibration method as claimed in claim 1, wherein, in the step of providing image sensor device, the image sensor device is selected from a CCD sensor or a CMOS sensor.

* * * * *